(12) United States Patent
Righi et al.

(10) Patent No.: US 8,706,428 B1
(45) Date of Patent: Apr. 22, 2014

(54) SYSTEM AND METHOD FOR DETERMINING INSTANTANEOUS DEFLECTION OF A STRUCTURE

(75) Inventors: Luigi Peter Righi, Laguna Hills, CA (US); Gregory Mark Wellbrook, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 482 days.

(21) Appl. No.: 13/090,190

(22) Filed: Apr. 19, 2011

(51) Int. Cl.
*G01B 3/44* (2006.01)
(52) U.S. Cl.
USPC .......................................................... 702/34
(58) Field of Classification Search
USPC .......................................................... 702/34
See application file for complete search history.

(56) References Cited

U.S. PATENT DOCUMENTS

| | | | |
|---|---|---|---|
| 3,979,949 A | 9/1976 | Smith | |
| 4,590,804 A | 5/1986 | Brull | |
| 6,618,654 B1 | 9/2003 | Zaat | |
| 6,691,007 B2 | 2/2004 | Haugse | |
| 6,799,463 B2 | 10/2004 | Fields | |
| 6,862,539 B2 | 3/2005 | Fields | |
| 7,403,294 B2* | 7/2008 | Handman et al. | 356/601 |
| 7,454,297 B2 | 11/2008 | Balestra | |
| 8,209,134 B2* | 6/2012 | Parker et al. | 702/34 |

OTHER PUBLICATIONS

Cowles et al., NASA Report, "Evaluation of the Cyclic Behavior of Aircraft Turbine Disk Alloys", Aug. 1980.

\* cited by examiner

*Primary Examiner* — Stephen Cherry

(57) ABSTRACT

A system may include a laser device, a target and a processor. The laser device may be mounted to the structure and may emit a laser beam. The target may also be mounted to the structure at a predetermined distance from the laser device. The laser beam may strike the target at a strike point. The target may include a plurality of photo-sensors sensing displacement of the strike point along the target corresponding to deflection of the structure. The processor may be coupled to the photo-sensors and may record a time history of the strike point displacement. The processor may determine at least one loading cycle of the structure based upon the predetermined distance and the displacement time history.

18 Claims, 5 Drawing Sheets

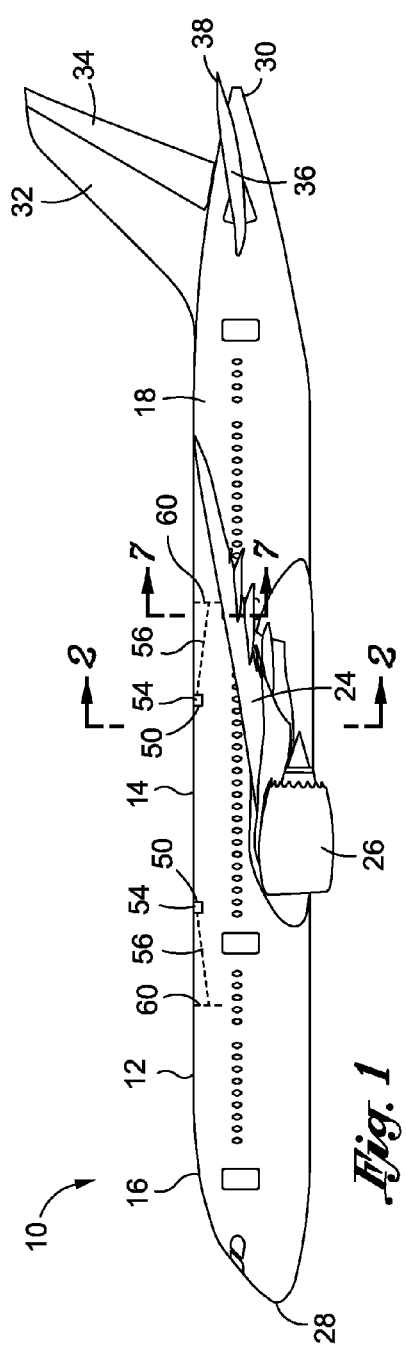
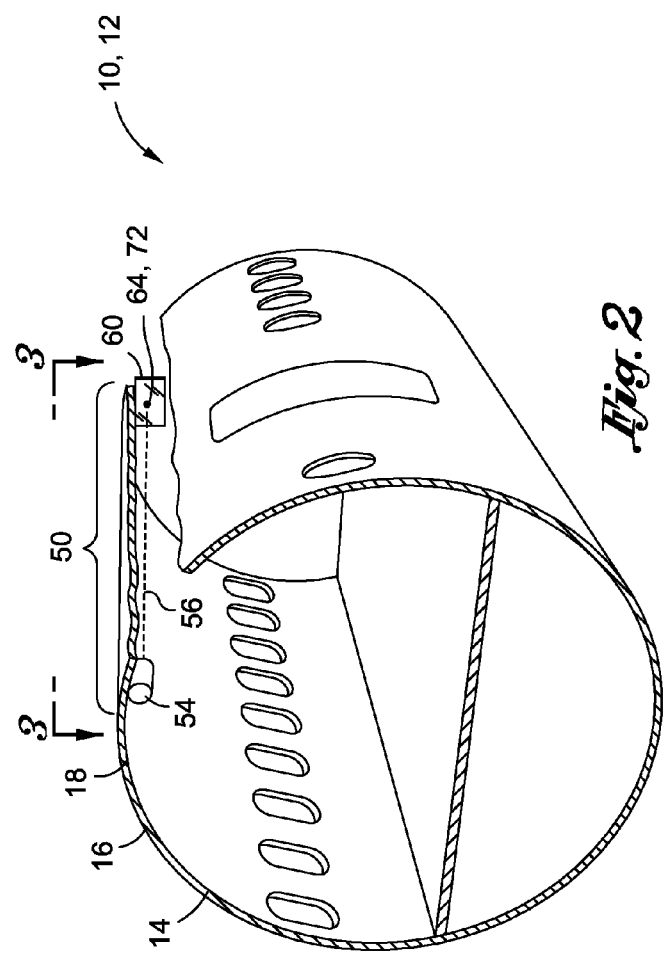

SYSTEM AND METHOD FOR DETERMINING INSTANTANEOUS DEFLECTION OF A STRUCTURE

FIELD

The present disclosure relates generally to structural load monitoring and, more particularly, to systems and methods for measuring deflection of a structure in response to loads on the structure.

BACKGROUND

Fatigue of a structure may occur during repeated or cyclical application of loads on the structure. For example, the fuselage, wings, and landing gear of an aircraft are subjected to cyclic loads of constantly varying magnitude during takeoff, cruise flight, and landing. During takeoff, the wings of the aircraft deflect upwardly resulting in a bending load on the wings as the weight of the aircraft is transferred from the landing gear to the wings. During cruise flight, the fuselage is subjected to bending loads due to wind gusts and during maneuvering of the aircraft. Each maneuver and each wind gust may cause the fuselage to deflect or bend slightly resulting in a momentary increase in the tension stress, compression stress, or shear stress in the fuselage skin and related structure.

During descent from altitude, the wings are typically subjected to relatively high-frequency bending load cycles as the aircraft encounters low-altitude turbulence. Each time the aircraft lands, contact of the landing gear with the runway results in the transmission of relatively large loads to the fuselage as the weight of the aircraft is transferred from the wings to the landing gear. In addition, during each takeoff and landing cycle, the passenger cabin is pressurized and depressurized which cyclically loads the fuselage skin in tension.

To compensate for fatigue, structures are typically designed using previously-developed design rules in combination with stress-cycle (i.e., S-N) curves for a given material. An S-N curve of a material plots the quantity (N) of loading cycles of stress (S) of a given magnitude that will result in fatigue failure of the material. Unfortunately, S-N curves for a given material only represent the fatigue limits of a material subjected to stress of a constant magnitude. However, the magnitudes of stress that a structure is subjected to during service may vary greatly between loading cycles which may result in the structure having an actual fatigue life that may be longer or shorter than the predicted fatigue life.

For aircraft structures, the magnitude of the loading cycles in the predicted fatigue life may be more severe than predicted resulting in under-designed aircraft having a shortened fatigue life. Conversely, the magnitude of the loading cycles may be less severe than predicted which may result in overdesigned aircraft that are heavier than necessary. The increased weight of the aircraft may result in reduced aircraft performance. In addition, the increased weight of the aircraft may reduce fuel economy.

As can be seen, there exists a need in the art for a system and method for accurately determining the fatigue life of an aircraft based on actual loading cycles.

BRIEF SUMMARY

The above-described needs associated with fatigue life are specifically addressed and alleviated by the present disclosure which, in an embodiment, provides a system comprising a laser device, a target, and a processor. The laser device may be mounted to the structure and may emit a laser beam. The target may also be mounted to the structure at a predetermined distance from the laser device. The laser beam may strike the target at a strike point. The target may include a plurality of photo-sensors sensing displacement of the strike point along the target corresponding to deflection of the structure. The processor may be coupled to the photo-sensors and may record a time history of the strike point displacement. The processor may determine at least one loading cycle of the structure based upon the predetermined distance and the displacement time history.

In a further embodiment, disclosed is an aircraft including an airframe having a predicted fatigue life. The aircraft may comprise a laser system mounted to the airframe which may include a laser device emitting a laser beam and a target positioned at a predetermined distance from the laser device. The target may have a reference point associated with a flight regime. The laser beam may strike the target at a strike point. The target may include a plurality of photo-sensors sensing displacement of the strike point along the target corresponding to deflection of the airframe. The aircraft may include a processor coupled to the photo-sensors. The processor may record a time history of the strike point displacement. The processor may determine at least one loading cycle of the airframe based upon the displacement time history and may calculate a remaining useful life of the airframe based upon the loading cycle, the predetermined distance and the predicted fatigue life.

Also disclosed is a method of monitoring deflection of a structure. The method may include the steps of emitting a laser beam from a laser device mounted to the structure and striking a target with the laser beam at a strike point. The target may be mounted to the structure at a predetermined distance from the laser device. The structure may be deflected during service. The method may include sensing a displacement of the strike point during deflection of the structure and recording a time history of the strike point displacement. In addition, the method may include determining at least one loading cycle of the structure based upon the predetermined distance and the displacement time history of the strike point.

In a further embodiment, disclosed is a method of determining a remaining useful life of an airframe subject to deflection and having a predicted fatigue life. The method may include the steps of emitting a laser beam from a laser device mounted to the airframe and striking a target with the laser beam at a strike point. The target may be mounted to the airframe at a predetermined distance from the laser device. The method may additionally include deflecting the airframe and sensing a displacement of the strike point during deflection of the airframe. In addition, the method may include recording a time history of the strike point displacement and determining at least one loading cycle of the airframe based upon the predetermined distance and the displacement time history of the strike point. The method may further include calculating a remaining useful life of the airframe based upon the loading cycle and the predicted fatigue life.

The features, functions and advantages that have been discussed can be achieved independently in various embodiments of the present disclosure or may be combined in yet other embodiments, further details of which can be seen with reference to the following description and drawings below

BRIEF DESCRIPTION OF THE DRAWINGS

These and other features of the present disclosure will become more apparent upon reference to the drawings wherein like numerals refer to like parts throughout and wherein:

FIG. 1 is a side view illustration of an aircraft having a fuselage with a pair of laser systems mounted to the fuselage;

FIG. 2 is a perspective view of a portion of the fuselage taken along line 2 of FIG. 1 and illustrating an embodiment of the laser system mounted to the fuselage;

DETAILED DESCRIPTION

Figure 3:
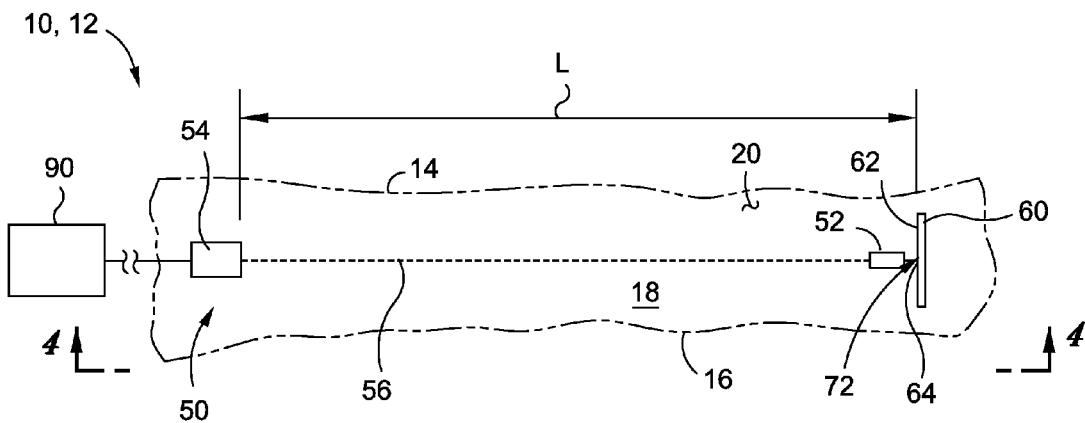
FIG. 3 is a top view illustration of a portion of the fuselage taken along line 3 of FIG. 2 and illustrating the laser system embodiment mounted to the fuselage and further illustrating a strain gauge mounted to the fuselage skin.

Referring now to the drawings wherein the showings are for purposes of illustrating preferred and various embodiments of the disclosure, shown in FIG. 1 is a perspective view of a passenger aircraft 12 having a fuselage 16 and a pair of wings 24 extending outwardly from the fuselage 16 and propulsion units 26 mounted to the wings 24. The fuselage 16 extends from the aircraft 12 nose 28 to a tail 30 at a rear end of the fuselage 16. The tail 30 may include a horizontal stabilizer 36, an elevator 38, a vertical stabilizer 32, and a rudder 34. The fuselage 16 may include a fuselage 16 skin 18 which may be supported by a plurality of circumferentially-spaced stringers (not shown) and a plurality of axially-spaced frames (not shown).

The present disclosure includes embodiments of a system 50 that may be mounted to a structure 10 such as an aircraft 12 for measuring deflection of the structure 10 and determining the magnitude and direction of loading cycles applied to the structure 10. In addition, the present disclosure includes embodiments of a system 50 and a method for determining the stress in the structure 10 in response to deflection of the structure 10. Furthermore, the disclosed embodiments include a system 50 and method for calculating strain in the structure 10 based upon the calculated stress. Also disclosed are embodiments of a system 50 and method for determining a remaining useful life of a structure 10 having a predicted fatigue life.

Advantageously, the present disclosure provides a means for accurately determining the remaining useful life of the structure 10 based upon the actual loading cycles to which the structure 10 may be subjected. In this regard, the systems 50 and methods provide a means to determine the amount of the predicted fatigue life that has been consumed based on the actual loading history (i.e., the loading cycles) of the structure 10 and then determine the remaining useful life based upon the difference between the predicted fatigue life and the amount of the predicted fatigue life that has been consumed. The predicted fatigue life may be based upon the structure being subjected to a predetermined quantity of loading cycles of a given magnitude and/or frequency.

The disclosed systems 50 and methods provide a means to adjust the remaining useful life of the structure 10 when the structure 10 is subject to loading cycles of a magnitude and/or frequency that exceed the magnitude and/or frequency of the loading cycles on which the predicted fatigue life is based. For example, the disclosed systems 50 and methods may reduce the remaining useful life of the structure 10 when the severity (i.e., magnitude) of loading cycles is greater than predicted or, alternatively, extend the remaining useful life of the structure 10 when the severity of loading cycles is less than predicted. In this regard, the remaining useful life of the structure 10 may be adjusted in proportion to the severity of the loading cycles. The adjustment of the remaining useful life of the structure 10 may be made on a continuous (i.e., in real-time) basis, on a periodic basis at predetermined time intervals, on an intermittent basis, or any combination thereof. In addition, the systems 50 and methods disclosed herein may provide a means for recording the actual loading cycles of a structure 10 to aid in the design, development, testing and production of other structures.

Although the systems 50 and methods disclosed herein are generally described in the context of a fuselage 16 of a fixed wing 24 passenger aircraft 12 as illustrated in FIG. 1, it is contemplated that the disclosed embodiments may be applied to any component of any aircraft configuration, without limitation. For example, the disclosed embodiments may be applied to any civil, commercial or military aircraft including fixed-wing and rotary-wing aircraft. In addition, the embodiments may be applied to alternative aircraft configurations and is not limited to the tube-and-wing configuration illustrated in FIG. 1. For example, the disclosed embodiments may be applied to hybrid wing-body aircraft. In this regard, the disclosed embodiments may be applied to any structure that is subject to deflection from loading cycles. In addition, the disclosed embodiments may be applied to structures fabricated of any material type, without limitation. For example, the embodiments may be applied to structures fabricated of metallic material, composite material such as fiber-reinforced polymeric material, and combinations of metallic material and composite material.

Referring to FIG. 1, shown is a side view of the aircraft 12 having a pair of laser systems 50 mounted to an upper portion or crown (now shown) of the fuselage 16. Each one of the laser systems 50 may include a laser device 54 emitting a laser beam 56 directed at a target 60. In a non-limiting embodiment, the laser system 50 may be mounted such that the laser beam 56 is oriented generally parallel to a longitudinal axis of the fuselage 16 such that the laser system 50 may measure deflection of the fuselage 16 and determine the magnitude and direction of loads in the loading cycles that may cause such deflection. Although each laser system 50 is mounted such that the laser beam 56 is oriented generally parallel to the longitudinal axis, the laser system 50 may be mounted such that the laser beam 56 is oriented to measure deflections in other directions. In addition, although FIG. 1 illustrates a pair of laser systems 50 mounted to the fuselage 16, any number of laser systems 50 including a single laser system 50 mounted to the fuselage 16.

Furthermore, although shown as being mounted to the fuselage 16, one or more of the laser system 50 may be mounted at any location on the aircraft 12. For example, one or more laser systems 50 may be mounted within a wing 24 of the aircraft 12 such as within a wing bay (not shown) between a pair of wing ribs (not shown) to measure deflection of the wing spar (not shown) and corresponding loads in the wing spar during wing bending cycles. The one or more laser systems 50 may be communicatively coupled to a processor 90 (FIG. 3) for determining loading cycles on the wing 24 based on deflection of the wing 24. Such loading cycles may include flight loads such as maneuver loads or gust loads imposed on the wing 24 during cruise flight or during other flight regimes. In this regard, one or more laser systems 50 may be mounted at any location of the aircraft 12 such as at a location identified as a highly-stressed location susceptible to fatigue. For example, one or more laser systems 50 may be installed at the intersection of the wing 24 and the fuselage 16, at the attach points of the landing gear (not shown) to the fuselage 16, at a pressure bulkhead (not shown) in the fuselage 16, or at any other location, without limitation.

Referring to FIG. 2, shown is a portion of the fuselage 16 illustrating a laser system 50 mounted to a crown area of the fuselage 16. The laser device 54 and the target 60 may be mounted to the fuselage 16 such as to the fuselage 16 skin 18 or to circumferential frames (not shown) or longitudinal frames (not shown) of the fuselage 16. The laser system 50 may also be mounted to other areas of the fuselage 16 such as at the lower portion or keel (not shown) or floor (not shown) of the fuselage 16 or at other locations. The laser device 54 may be oriented such that the laser beam 56 strikes the target 60 at a strike point 72. The strike point 72 may be displaced along the target 60 in response to deflection of the structure 10 as a result of loads applied during one or more loading cycles.

Referring to FIG. 3, shown is a top view of the fuselage 16 illustrating the laser device 54 and the target 60 mounted to the fuselage 16. The laser device 54 and/or target 60 may be communicatively coupled to a processor 90 by hardwire connection or by wireless means. The processor 90 may receive data regarding the position of the strike point 72 on the target 60 and may record a time history of the strike point displacement Δ (FIG. 6) as described below. The target 60 may be located at a predetermined distance L from the laser device 54. The predetermined distance L may be selected based upon a number of factors including, but not limited to, the desired accuracy of the deflection measurement, the sensitivity of the target 60 in sensing the position of the strike point 72, the availability of line-of-sight between the laser device 54 and the target 60, the resolution of the laser beam 56, and other factors. Also shown is a strain gauge 52 or other device for measuring strain in the structure 10. The strain gauge 52 may measure strain occurring IN the structure 10 during deflection of the structure 10 and which may be compared to strain that may be calculated by the processor 90 in response to the deflection measured by the laser system 50 as described in greater detail below.

Figure 4:
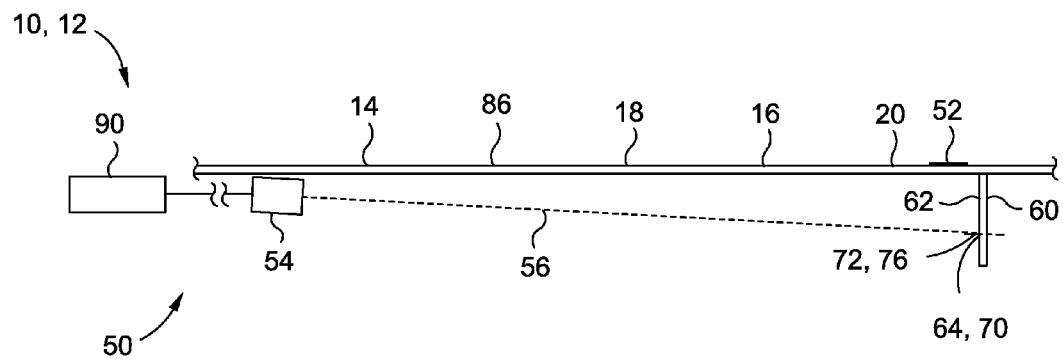
FIG. 4 is a side view illustration of the laser system taken along line 4 of FIG. 3 and illustrating a laser device emitting a laser beam striking a target at a strike point and wherein the strike point in FIG. 4 comprises a reference point on the target.

Referring to FIG. 4, shown is a side view of the laser system 50 mounted to the fuselage 16 in an undeflected state 86. The target 60 is preferably fixedly mounted to the fuselage 16 such that the fuselage 16 and target 60 are non-movable relative to one another during deflection of the fuselage 16. Likewise, the laser device 54 is preferably fixedly mounted to the fuselage 16 such that the laser device 54 and fuselage 16 are non-movable relative to one another during deflection of the fuselage 16. Although the laser device 54 and the target 60 are shown mounted to the fuselage 16 skin 18, the laser device 54 and target 60 may be mounted to a portion of the structure 10 having a relatively high degree of local stiffness to minimize local flexing or local movement of the laser device 54 and target 60. In this regard, the target 60 and the laser device 54 are preferably mounted such that movement of the laser device 54 and target 60 is limited to movement during deflection of the structure 10 in response to loading cycles.

FIG. 4 further illustrates the laser beam 56 striking the target 60 at a strike point 72. When the fuselage 16 is in the undeflected state 86, the strike point 72 may strike the target 60 at a reference point 64. Displacement of the strike point 72 may be measured with respect to the reference point 64. The location of the reference point 64 may be at different locations on the target 60 depending upon the flight regime of the aircraft 12. For example, as described in greater detail below, the reference point 64 during cruise flight may be at different position compared to the position of the reference point 64 when the aircraft 12 is on the ground during ground operations such as when the aircraft 12 is idle.

Figure 5:
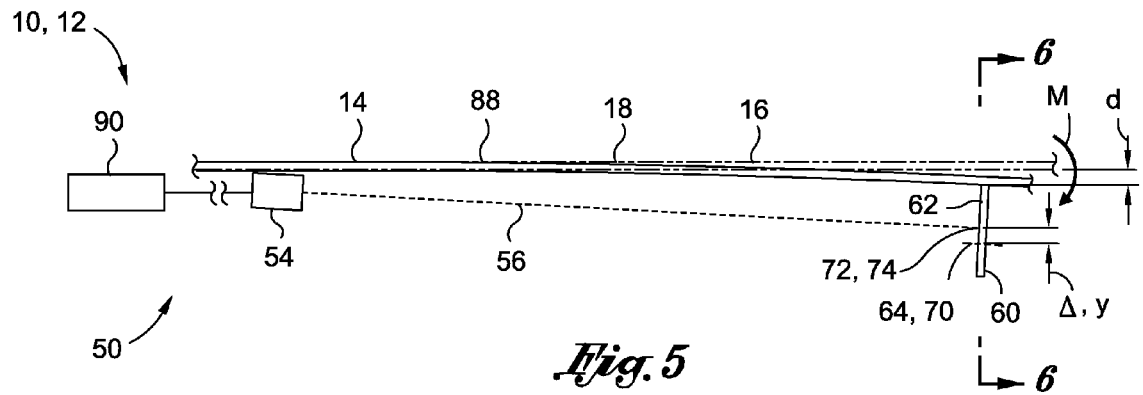
FIG. 5 is a side view illustration of the laser system of FIG. 4 and illustrating the laser beam striking the target at a strike point displaced from the reference point as a result of deflection of the fuselage due to a load (i.e., bending moment) applied to the fuselage during a loading cycle.

Referring to FIG. 5, shown is a side view of the fuselage 16 in a deflected state 88 wherein the fuselage 16 skin 18 is placed in bending as a result of a load applied to the fuselage 16 in the form of a bending moment M. Under a positive 1-g loading when the aircraft 12 is in generally straight-and-level cruise flight, the weight of the aircraft 12 is supported by the wings 24 which results in a generally constant (over time) bending moment on the fuselage 16. However, upon encountering turbulence, one or more loading cycles 78 (FIG. 6) may be applied to the fuselage 16 in the form of an additional instantaneous bending moment M on the fuselage 16. During each loading cycle 78, the additional bending moment M may occur as a result of an up-gust which may generate a brief or instantaneous increase in lift of the wings 24. The brief increase in wing lift may be transmitted to the fuselage 16 causing the downward bending moment M in the fuselage 16 on opposite sides of where the wings 24 intersect the fuselage 16.

Figure 6:
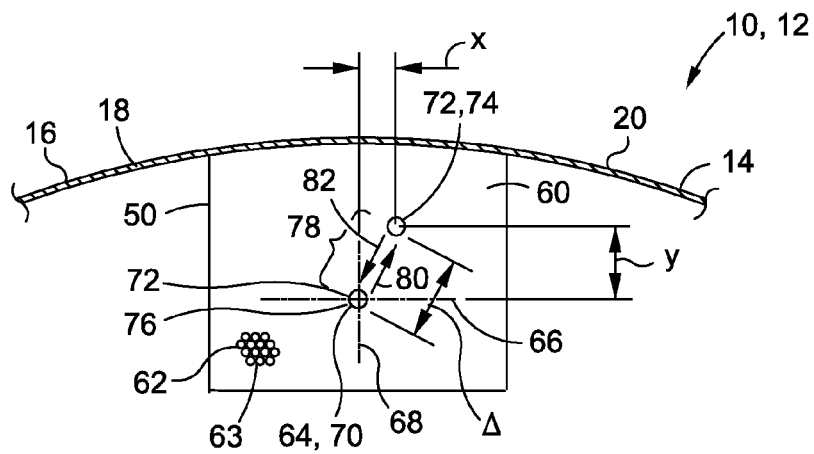
FIG. 6 is a front view of the target taken along line 6 of FIG. 5 and illustrating the displacement of the strike point on the target relative to the reference point in response to the deflection of the fuselage under the applied load.

Referring to FIG. 6, shown is a front view of the target 60 illustrating the displacement Δ of the strike point 72 on the target 60 relative to the reference point 64 in response to the downward deflection d (FIG. 5) of the fuselage 16 under the bending moment M (FIG. 5). The strike point displacement Δ may represent one loading cycle 78 and may include a vertical component y measured relative to an x-axis 66 passing through the reference point 64 and a horizontal component x measured relative to a y-axis 68 passing through the reference point 64. The vertical component y may represent defection of the structure 10 due to the bending moment M (FIG. 5) in response to the up-gust. The horizontal component x may represent a lateral load such as a side gust or a maneuver load. In response to the up-gust, the strike point 72 may be displaced from the reference point 64. The reference point 64 may represent a minimum load 76 of the loading cycle 78 such as during straight-and-level 1-g flight. The end or terminus of the strike point displacement Δ may represent a maximum load 74 of the loading cycle 78. The displacement of the strike point 72 from the reference point 64 may comprise the loading portion 80 of the loading cycle 78. The displacement of the strike point 72 back toward the reference point 64 may comprise an unloading portion 82 of the loading cycle 78.

The target 60 may include one or more sensors for sensing displacement of the strike point 72 along the target 60. In a non-limiting embodiment, the sensors may comprise a pixel grid 63 of photo-sensors 62 forming an array of light-detecting elements for sensing the strike point 72 of the laser beam 56 (FIG. 5). The photo-sensors 62 may comprise a charge coupled device (CCD) and/or a complementary metal oxide semiconductor (CMOS) device. However, the target 60 may include any one of a variety of photo-sensor 62 configurations including a computer vision or machine vision embodiment.

The target 60 may be coupled to a processor 90 (FIG. 5) such as by wireless or hardwire connection. The target 60 may also be coupled to the laser device 54 (FIG. 5) for controlling the operation thereof. The processor 90 may receive signals from the photo-sensors 62 and may determine the location of the laser beam 56 (FIG. 5) relative to the reference point 64 based upon the signals. If the laser beam 56 strikes the target 60 between one or more photo-sensors 62 (e.g., pixels), the processor 90 may be configured to determine the location of a centroid (not shown) of the strike point 72 on the pixel grid 63 relative to the reference point 64 such as by mathematical analysis. The processor 90 may also control or regulate a sampling rate or sampling frequency at which the photo-sensors 62 sense the laser beam 56.

In this regard, the processor 90 may control the sampling frequency on a microsecond or millisecond basis based upon the data storage and processing capability of the processor 90, the flight regime, and other factors. For example, during certain flight regimes such as during final descent prior to landing, the aircraft 12 may be subjected to low-level turbulence that may not exist at higher cruising altitudes. The processor 90 may be programmed to increase the sampling rate during the final descent and landing phase of the flight to capture a greater frequency of strike point displacements $\Delta$.

Referring still to FIG. 6, the processor 90 (FIG. 5) may record a time history of the strike point displacements $\Delta$ based upon the data received from the target 60. For each loading cycle 78, the processor 90 may determine the load magnitude (i.e., maximum load) of the loading cycle 78 based upon the displacement time history and the distance L (FIG. 3) between the laser and the target 60. For the example of the simplified fuselage 16 structure 10 illustrated in FIG. 2, the load magnitude may be calculated given the stiffness properties of the structure 10. For example, assuming a constant bending stiffness of the fuselage 16 between the laser device 54 and the target 60, displacement of the strike point 72 may be characterized by the following equation:

$$y=ML^2/EI \quad \text{(Equation 1)}$$

wherein y is the vertical component of the strike point displacement $\Delta$ (FIG. 6), L (FIG. 3) is the distance between the laser device 54 and the target 60, E is the modulus of elasticity (i.e., tensile modulus or Young's modulus) of the fuselage 16 skin 18, and I is the area moment of inertia of the fuselage 16. Equation 1 can be rearranged to solve for the bending moment M (FIG. 5) as follows:

$$M=yEI/L^2 \quad \text{(Equation 2)}$$

As may be appreciated, the load on a structure 10 may comprise any number of load types and is not limited to a bending moment M (FIG. 5) as may result from an up-gust on a fuselage 16. In this regard, the load in a loading cycle 78 acting on a structure 10 may comprise a distributed load or a point load acting on the structure 10. The load in a loading cycle 78 may also comprise an axial load (e.g., a compression load or a tension load), a shear load, a torsional load, or any one of a variety of other loads or combinations thereof.

Referring still to the example of the simplified fuselage 16 structure 10 illustrated in FIG. 2, the maximum stress $\sigma$ in the fuselage 16 due to bending may occur at the outer surface 20 of the fuselage 16 skin 18 and may be calculated by the following equation:

$$\sigma=Mc/I \quad \text{(Equation 3)}$$

wherein M is the bending moment represented by Equation 2 and I is the area moment of inertia of the fuselage 16 cross section.

Figure 7:
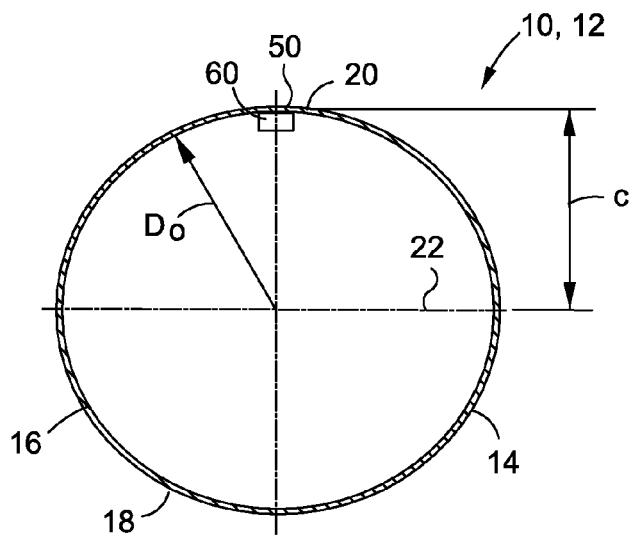
FIG. 7 is a cross-sectional view of the fuselage taken along line 7 of FIG. 1 and illustrating the dimension c measured from a neutral axis of the fuselage to an outer diameter thereof and wherein c is a factor in calculating stress in the fuselage skin during deflection of the fuselage under the applied load.

FIG. 7 illustrates the measurement of the variable c from a neutral axis 22 of the fuselage 16 to the outer surface 20 of the fuselage 16 skin 18 and which is defined by the following:

$$c=D_o/2 \quad \text{(Equation 4)}$$

wherein $D_o$ is the diameter of the outer surface 20 of the fuselage 16 skin 18. Substituting the expression for M (Equation 2) and the expression for c (Equation 4) into Equation 3, the maximum stress $\sigma$ can be rewritten as follows:

$$\sigma=yED_o/2L^2 \quad \text{(Equation 5)}$$

The processor 90 may be configured to determine a calculated stress such as the maximum bending stress $\sigma$ (Equation 5) that may occur in a structure 10. For example, based upon the maximum load 74 (FIG. 6) calculated in a loading cycle 78 (FIG. 6) acting on the fuselage 16, the processor 90 may be configured to calculate the maximum bending stress $\sigma$ corresponding to the maximum load 74 imposed on the fuselage 16 during each loading cycle 78.

Figure 8:
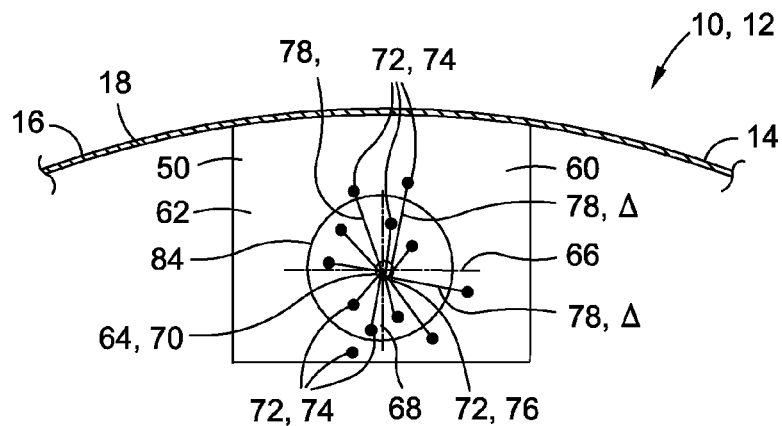
FIG. 8 is a front view of the target illustrating multiple displacements of the strike point relative to the reference point and wherein the multiple strike point displacements correspond to multiple loading cycles applied to the fuselage.

FIG. 8 is a view of the target 60 illustrating multiple displacements of the strike point 72 relative to the reference point 64 as may occur over the course of a flight of an aircraft 12 (FIG. 1). Each one of the strike point displacements $\Delta$ may represent a loading cycle 78 applied to the fuselage 16. The reference point 64 may represent a minimum load 76 of each loading cycle 78. A maximum load 74 of each loading cycle 78 may be represented at an end of each strike point displacement $\Delta$ (FIG. 6) opposite the reference point 64. The location of each strike point 72 may be representative of the load direction and load magnitude of a loading cycle 78. As indicated above, the vertical component y (FIG. 6) of each one of the strike point displacements $\Delta$ is measured relative to the x-axis 66 (FIG. 6) of the reference point 64 and may represent a vertical force (not shown) or bending moment M (FIG. 5) applied to the fuselage 16. Such a load may result from an up-gust or a down-gust or a maneuver load caused by upward or downward actuation of the elevator 38 (FIG. 1). A horizontal component x (FIG. 6) of each one of the strike point displacements $\Delta$ (FIG. 6) is measured relative to the y-axis 68 of the reference point 64 and may represent a horizontal force (not shown) or lateral bending moment (not shown) applied to the fuselage 16. Such horizontal load may result from a side-gust acting on the aircraft 12 or a maneuver load that may be caused by activation of one of the control surfaces such as the rudder 34 (FIG. 1).

Referring again to FIG. 5, the processor 90 may receive signals from the photo-sensor 62 and may record a time history of the strike point displacement $\Delta$. The processor 90 may process the time history of the strike point displacement $\Delta$ and may determine the horizontal component x and vertical component y of each strike point displacement $\Delta$. The processor 90 may additionally determine a magnitude and direction of deflection d of the structure 10 in correspondence to the magnitude and direction of each strike point displacement $\Delta$. The processor 90 may additionally determine a calculated stress in the structure 10 corresponding to each one of the loading cycles 78 as indicated above. Furthermore, the processor 90 may determine a frequency of occurrence of the strike point displacement Δ over a given time period such as during the course of a flight cycle (i.e., from takeoff to landing) or during one or more portions of a flight cycle.

Referring still to FIG. 5, in an embodiment, the processor 90 may determine a remaining useful life of the structure 10 based upon the predicted fatigue life of the structure 10. As indicated above, the predicted fatigue life of the structure 10 may be predetermined during the design and development of the structure 10 and may be defined in terms of loading cycles on the structure 10. The processor 90 may be configured to calculate the stress in the structure 10 corresponding to each one of the loading cycles 78 on the structure 10. In an embodiment, the processor 90 may be configured to adjust (e.g., reduce) the remaining useful life of the structure 10 when the calculated stress exceeds an allowable stress of the material of the structure 10. The allowable stress of the material may be predetermined and may be defined by applying a safety factor to the yield stress corresponding to the elastic limit of the material above which the material plastically deforms.

Referring again to FIG. 8, in an embodiment, the allowable stress of the structure 10 may be graphically represented by a tolerance zone 84. Although the tolerance zone 84 is illustrated as having a circular shape, the tolerance zone 84 may have any shape that represents the allowable stress for one or more directions in which the structure 10 may be loaded. In an embodiment, the processor 90 (FIG. 5) may be configured to adjust the remaining useful life of the structure 10 where the strike point displacement Δ of a predetermined quantity of loading cycles 78 (FIG. 8) extends beyond the tolerance zone 84 indicating that the allowable stress is exceeded. In the case of the simplified fuselage 16 structure 10 illustrated in FIG. 2, the processor 90 may be configured to reduce the remaining useful life of the fuselage 16 after being subjected to a predetermined quantity of loading cycles 78 wherein the bending moment M (FIG. 5) results in the strike point displacement Δ representing the tensile stress in the fuselage 16 skin 18 exceeding the allowable stress of the skin 18.

In a further embodiment, the processor 90 may be configured to calculate a strain in the structure 10 during a loading cycle 78. The calculated strain may correspond to the calculated stress in the structure 10 during the loading cycle 78. Strain may be defined as the relative displacement (e.g., elongation) of a material per unit length of the material. For linearly elastic material up to the yield stress, Young's modulus relates stress to strain and may be rewritten as follows to solve for strain:

$$\epsilon = \sigma/E \quad \text{(Equation 6)}$$

wherein δ represents strain, E represents Young's modulus for a given material, and σ represents stress in the material.

Referring to FIG. 8, the tolerance zone 84 may be defined as the yield stress of the material wherein the yield stress is the stress above which the material plastically (i.e., permanently) deforms. The processor 90 (FIG. 5) may be configured to adjust the remaining useful life of the structure 10 when the calculated stress due to a loading cycle 78 extends beyond the tolerance zone 84. In the case of the fuselage 16 structure 10 illustrated in FIG. 2, the processor 90 may be configured to reduce the remaining useful life of the fuselage 16 after being subjected to a quantity of loading cycles 78 wherein the stress from the bending moment M (FIG. 5) results in the stress of the skin 18 exceeding the yield stress of the skin material.

The processor 90 (FIG. 5) may additionally determine the frequency of the strike point displacement Δ over a given time period as mentioned above. The frequency of the strike point displacement Δ may directly correspond to the rate at which the structure 10 is subjected to loading cycles 78 (i.e., the loading cycle 78 frequency). In an embodiment, the processor 90 may be configured to adjust the remaining useful life of the structure 10 in proportion to the strike point displacement Δ frequency. In this regard, it has been shown that for certain stress magnitudes, relatively low frequency loading cycles may increase the fatigue rate of a structure relative to the fatigue rate of a structure subjected to higher frequency loading cycles of the same stress magnitude. In the present disclosure, the processor 90 may adjust the remaining useful life of the structure 10 in proportion the loading cycle 78 frequency. For example, for relatively low frequency loading cycles 78 of a given stress magnitude, the processor 90 may reduce the remaining useful life of the structure 10 by an amount that is greater than the amount by which the remaining useful life of the structure 10 is reduced for relatively high frequency loading cycles 78 at the given stress magnitude. However, depending upon the loading conditions of the structure 10 and the stress magnitudes of the loading cycles 78, the processor 90 may optionally reduce the remaining useful life of the structure 10 for relatively low frequency loading cycles 78 by an amount that is less than the reduction in remaining useful life for relatively high frequency loading cycles 78.

Figure 9:
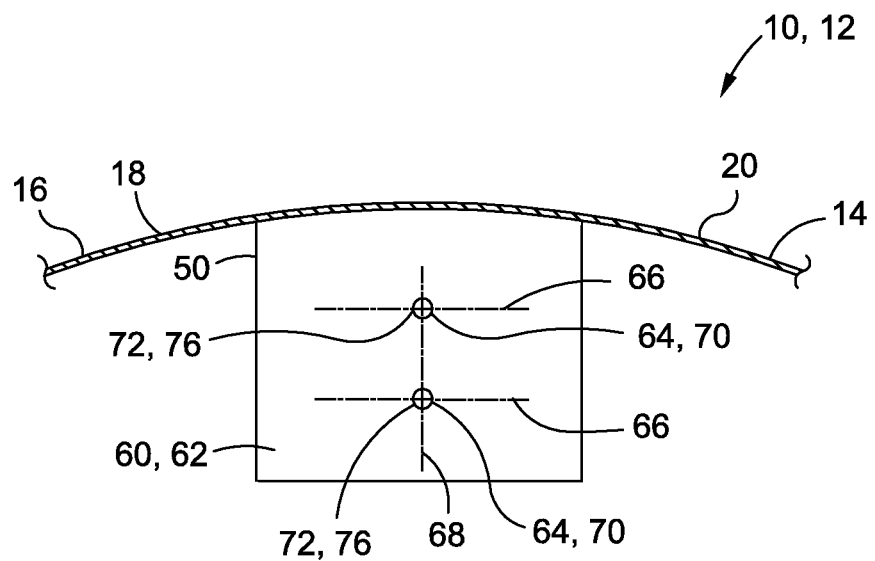
FIG. 9 is a front view of the target illustrating adjustment of the position of the reference point in response to a change in the flight regime of the aircraft.

Referring to FIG. 9, shown is the target 60 having a pair of reference points 64 corresponding to different flight regimes. Each reference point 64 may correspond to a neutral position 70 of a strike point 72 when the structure 10 is unloaded or is in a neutral state. For example, the lowermost reference point 64 in FIG. 9 may correspond to the aircraft 12 on the ground such as in a static condition where no loads other than primarily gravitational loads are exerted on the fuselage 16. During such regime, the strike point displacements Δ may be measured relative to the lowermost reference point 64 such that the strike point displacements Δ (FIG. 8) during ground operations (e.g., aircraft taxiing) will appear similar to the displacements Δ on the target 60 illustrated in FIG. 8.

Figure 10:
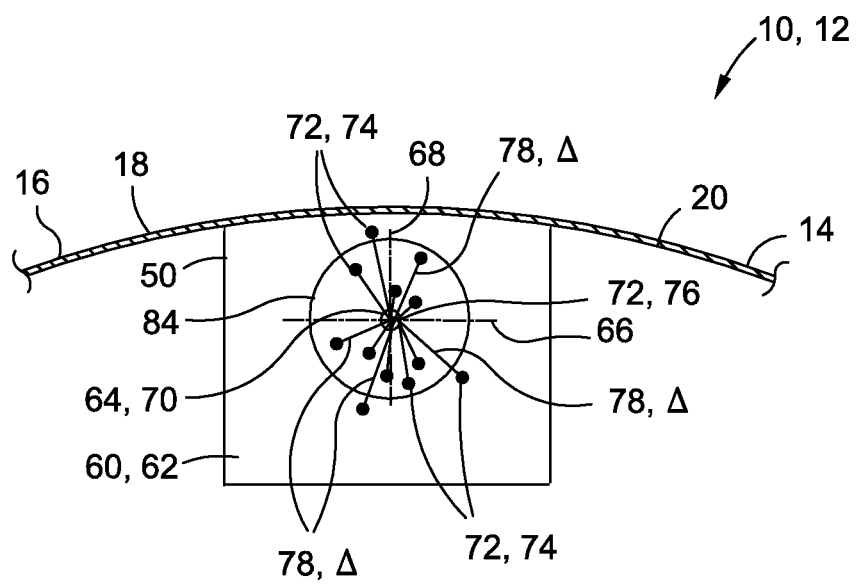
FIG. 10 is a front view of the target illustrating multiple displacements of the strike relative from the adjusted reference point.

Referring to FIGS. 9-10, the aircraft 12 may transition to a different flight regime such as a transition to a cruise flight regime after takeoff. In the cruise flight regime, the fuselage 16 may be subjected to a generally constant 1-g loading in straight-and-level flight at altitude. In this regard, the fuselage 16 may be subjected to a constant (e.g., over time) bending moment due to the mass of the fuselage 16 being supported by the wings 24. In such flight regime, the laser beam 56 may strike the target 60 at the uppermost reference point 64 as shown in FIG. 9. All displacements Δ of the strike point 72 may be biased back toward the uppermost reference point 64. FIG. 10 illustrates the target 60 showing the strike point displacement Δ (FIG. 6) from the uppermost reference point 64. In a similar manner, the reference point 64 may be adjusted for different flight regimes.

Figure 11:
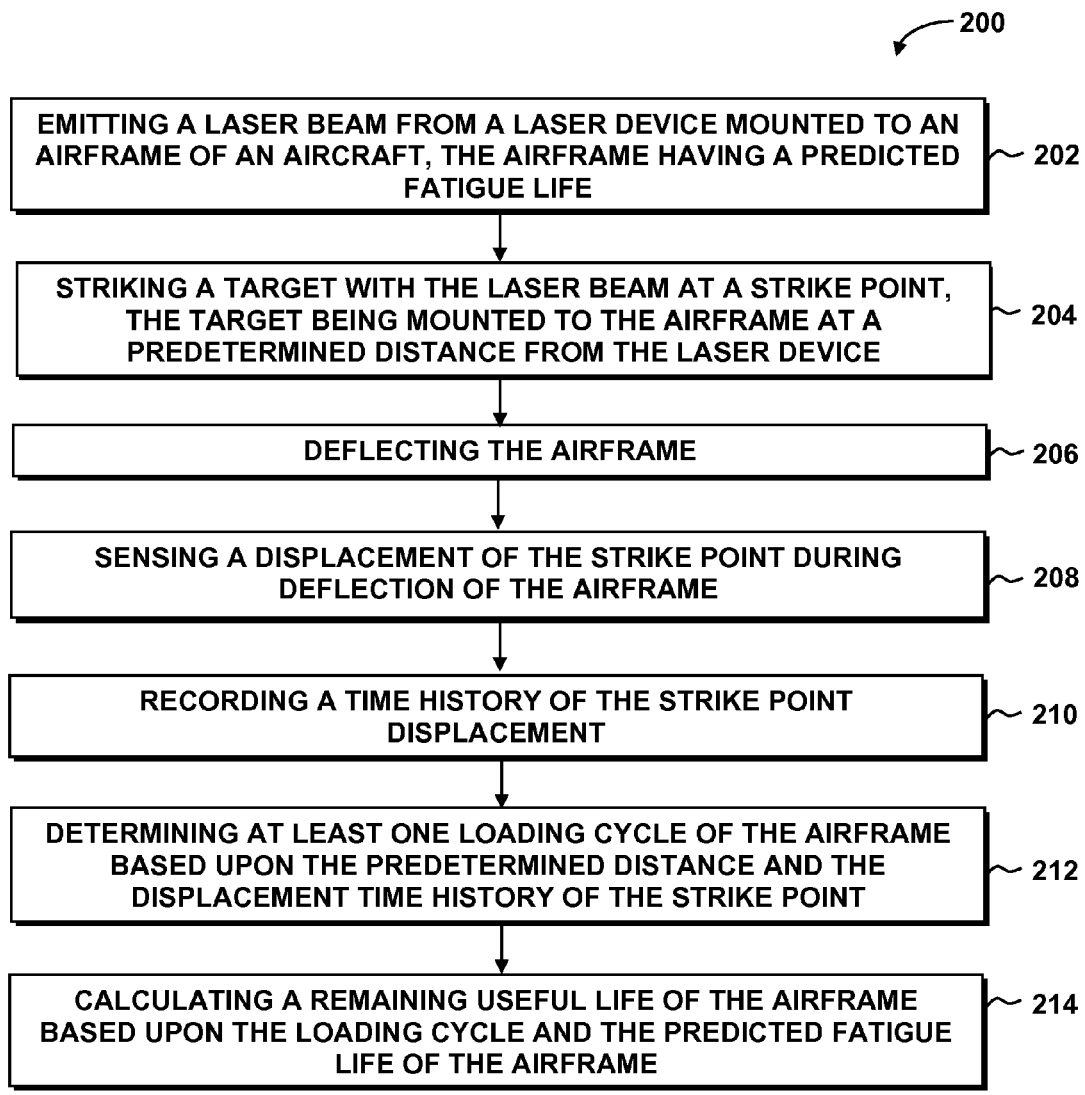
FIG. 11 is an illustration of a flow diagram representing one or more operations that may be included in a methodology for determining a remaining useful life of an airframe subject to deflection during the application of multiple loading cycles.

Referring to FIG. 11, shown is a flow diagram including one or more operations that may comprise a methodology 200 for determining a remaining useful life of an airframe 14 (FIG. 1) subject to deflection during the application of multiple loading cycles 78 (FIG. 8). Although the methodology 200 is generally described in the context of an airframe 14 of an aircraft 12 as illustrated in FIG. 1, the methodology 200 may be applied to any structure 10, without limitation.

Step 202 of the methodology 200 may comprise emitting a laser beam 56 (FIG. 5) from a laser device 54 (FIG. 5) mounted to the airframe 14 (FIG. 5). The airframe 14 may have a predicted fatigue life that may be predetermined during the design and development of the airframe and may be defined in terms of loading cycles on the airframe 14 and/or in terms of hours of service life of the aircraft 12 (FIG. 1). The laser device 54 is preferably non-movably mounted to the airframe 14. In addition, the target 60 is preferably mounted to the airframe 14 at a relatively stiff location to minimize local movement of the target 60 (FIG. 3).

Step 204 may comprise striking the target 60 (FIG. 3) with the laser beam 56 (FIG. 3) at the strike point 72. The target 60 may be mounted to the airframe 14 (FIG. 3) at a predetermined distance L (FIG. 3) from the laser device 54 as shown in FIG. 3. The predetermined distance L may be selected based upon the required accuracy of the deflection measurement, the sensitivity of the target 60, and other factors.

Step 206 may comprise deflecting the airframe 14 in response to a load of a loading cycle 78. For example, the fuselage 16 illustrated in FIG. 5 may be deflected in response to a bending moment M (FIG. 5) applied to the fuselage 16. The bending moment M may occur in response to an up-gust acting on the aircraft 12 wings 24 (FIG. 1).

Step 208 may comprise sensing the displacement of the strike point 72 (FIG. 5) during deflection of the airframe 14 (FIG. 5). FIG. 5 illustrates the vertical component y of the strike point displacement Δ and the corresponding deflection d of the structure 10. The target 60 (FIG. 5) may include a plurality of photo-sensors 62 (FIG. 5) which may sense the position of the laser beam 56 and may send signals representative of the strike point displacement Δ to the processor 90 (FIG. 5).

Step 210 may comprise recording the time history of the strike point displacements Δ (FIG. 5). For example, the processor 90 (FIG. 5) may be activated to initiate recording of the time history of the strike point displacements Δ when the aircraft 12 (FIG. 5) is placed in motion on the ground. The processor 90 may alternatively be programmed to record the time history during certain flight regimes such as upon starting the takeoff roll. The processor 90 may record the time history of strike point displacements Δ during a flight until the aircraft 12 arrives at a destination and is parked on the ground. The processor 90 may further be configured to adjust the sampling rate to record the strike point displacements Δ at different rates for different flight regimes. For example, a higher frequency sampling rate may be desired during takeoff and landing due to increased turbulence typically associated with such flight regimes.

Step 212 may comprise determining a magnitude and/or a direction of at least one loading cycle 78 (FIG. 5) of the airframe 14 (FIG. 5) based upon the displacement time history of the strike point 72 (FIG. 5) and the predetermined distance L (FIG. 3) between the laser device 54 (FIG. 5) and the target 60 (FIG. 5). From the magnitude and direction of the load of the loading cycle, the stress in the airframe 14 during the loading cycle 78 may be calculated. The stress in the airframe 14 may be compared to an allowable stress of the airframe 14 material.

Step 214 may comprise calculating the remaining useful life of the airframe 14 (FIG. 5) based upon the loading cycle 78 (FIG. 5) and the predicted fatigue life. For example, prior to placing the airframe 14 in service, the remaining useful life of the airframe may be generally equivalent to the predicted fatigue life. Upon placing the airframe 14 in service, the predicted fatigue of the airframe 14 may be gradually consumed as the airframe 14 is subjected to loading cycles 78 resulting in a gradual reduction in the remaining useful life of the airframe 14. The remaining useful life of the airframe 14 may be adjusted or reduced by an increased amount when the calculated stress exceeds the allowable stress of the material of the airframe 14. Likewise, the strain in the airframe 14 may be calculated based upon the calculated stress in the airframe 14. The remaining useful life of the airframe 14 may be adjusted or reduced by an increased amount when the calculated strain exceeds the yield stress of the material of the airframe 14.

The determination of the remaining useful life of an airframe 14 (FIG. 1) may further include adjusting the remaining useful life of the airframe 14 in proportion to the strike point displacement Δ frequency. As indicated above, the strike point displacement Δ frequency may be representative of the loading cycle 78 frequency. In an embodiment, the remaining useful life of the airframe 14 may be adjusted in proportion the loading cycle 78 frequency. For example, for relatively low frequency loading cycles 78 of a given stress magnitude, the remaining useful life of the airframe 14 may be reduced by an amount that is greater than the amount by which the remaining useful life of the airframe 14 is reduced for relatively high frequency loading cycles 78. Conversely, for relatively low frequency loading cycles 78, the remaining useful life of the airframe 14 may be reduced by an amount that is less than the reduction in the remaining useful life for relatively high frequency loading cycles 78.

The determination of the remaining useful life of an airframe 14 (FIG. 1) may additionally include operating the aircraft 12 (FIG. 5) in at least two different flight regimes and adjusting the position of the reference point 64 (FIG. 5) in correspondence with each flight regime. In this regard, the processor 90 may be configured to determine the strike point displacements Δ (FIG. 5) based upon the reference point 64 associated with a given flight regime. The processor 90 may be further configured to accurately calculate the loads corresponding to the strike point displacements Δ for the corresponding reference points 64.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A system, comprising:
    a laser device mounted to a structure and emitting a laser beam, the structure having a predicted fatigue life representing the quantity of loading cycles of a given magnitude and frequency that will result in fatigue failure;
    a target mounted to the structure at a predetermined distance from the laser device, the laser beam striking the target at a strike point, the target including a plurality of photo-sensors sensing displacement of the strike point along the target corresponding to deflection of the structure; and
    a processor coupled to the photo-sensors and recording a time history of the strike point displacement, the processor determining at least one loading cycle of the structure based upon the predetermined distance and the displacement time history, the processor calculating a remaining useful life of the structure based upon the loading cycle and the predicted fatigue life.

2. The system of claim 1 wherein:
    the processor determines a magnitude of the deflection of the structure corresponding to the strike point displacement; and
    the processor determining a maximum load of the loading cycle corresponding to the magnitude of the deflection of the structure.

3. The system of claim 1 wherein:
the processor determines a calculated stress in the structure during the loading cycle.

4. The system of claim 3 wherein:
the structure is formed of material having an allowable stress; and
the processor adjusting the remaining useful life when the calculated stress exceeds the allowable stress.

5. The system of claim 3 wherein:
the processor determines a calculated strain in the structure corresponding to the calculated stress in the structure during the loading cycle.

6. The system of claim 1 wherein:
the processor determines a frequency of the strike point displacement; and
the processor adjusting the remaining useful life in proportion to the strike point displacement frequency.

7. The system of claim 1 wherein:
the photo-sensors comprise at least one of a charge coupled device and a complementary metal oxide semiconductor device.

8. An aircraft including an airframe, comprising:
a laser system mounted to the airframe, the airframe having a predicted fatigue life representing the quantity of loading cycles of a given magnitude and frequency that will result in fatigue failure, the laser system including:
a laser device emitting a laser beam; and
a target positioned at a predetermined distance from the laser device and having a reference point, the laser beam striking the target at a strike point, the target including a plurality of photo-sensors sensing displacement of the strike point along the target relative to the reference point and corresponding to deflection of the airframe; and
a processor coupled to the photo-sensors and recording a time history of the strike point displacement, the processor determining at least one loading cycle of the airframe based upon the displacement time history, the processor calculating a remaining useful life of the airframe based upon the loading cycle, the predetermined distance and the predicted fatigue life.

9. The system of claim 8 wherein:
the airframe comprises at least one of the following: a fuselage, a wing.

10. A method of monitoring deflection of a structure, comprising the steps of:
emitting a laser beam from a laser device mounted to the structure, the structure having a predicted fatigue life representing the quantity of loading cycles of a given magnitude and frequency that will result in fatigue failure;
striking a target with the laser beam at a strike point, the target being mounted to the structure at a predetermined distance from the laser device;
deflecting the structure;
sensing a displacement of the strike point during deflection of the structure;
recording a time history of the strike point displacement;
determining at least one loading cycle of the structure based upon the predetermined distance and the time history of the strike point displacement; and
calculating a remaining useful life of the structure based upon the loading cycle and the predicted fatigue life.

11. The method of claim 10 further comprising the steps of:
determining a magnitude and a direction of deflection of the structure corresponding to the strike point displacement; and
determining a maximum load applied to the structure corresponding to the magnitude and direction of deflection of the structure during the loading cycle.

12. The method of claim 10 further comprising the step of:
calculating a stress in the structure during at least one of the loading cycles.

13. The method of claim 12 wherein the structure is formed of material having an allowable stress, the method further comprising the step of:
adjusting the remaining useful life when the calculated stress exceeds the allowable stress.

14. The method of claim 12 wherein comprising the steps of:
determining a frequency of the strike point displacement; and
adjusting the remaining useful life in proportion to the strike point displacement frequency.

15. The method of claim 12 further comprising the step of:
determining a calculated strain in the structure corresponding to the calculated stress during the loading cycle.

16. The method of claim 15 wherein the structure is formed of material having a yield stress, the method further comprising the step of:
adjusting the remaining useful life when the calculated strain exceeds the yield stress.

17. The method of claim 10 wherein the structure comprises an aircraft, the target including a reference point associated with a flight regime of the aircraft, the method further comprising the steps of:
operating the aircraft in at least two different flight regimes; and
adjusting a position of the reference point to correspond to the flight regime.

18. A method of determining a remaining useful life of an airframe subject to deflection and having a predicted fatigue life, comprising the steps of:
emitting a laser beam from a laser device mounted to the airframe, the airframe having a predicted fatigue life representing the quantity of loading cycles of a given magnitude and frequency that will result in fatigue failure;
striking a target with the laser beam at a strike point, the target being mounted to the airframe at a predetermined distance from the laser device;
deflecting the airframe;
sensing a displacement of the strike point during deflection of the airframe;
recording a time history of the strike point displacement;
determining at least one loading cycle of the airframe based upon the predetermined distance and the displacement time history of the strike point; and
calculating a remaining useful life of the airframe based upon the loading cycle and the predicted fatigue life.

* * * * *